(No Model.)

J. W. HARKOM.
RAILWAY CROSSING SIGNAL.

No. 392,798. Patented Nov. 13, 1888.

Witnesses:
Wm P. McFeat
Fred J. Sears

Inventor:
J. W. Harkom
By his Attys.

United States Patent Office.

JOHN W. HARKOM, OF RICHMOND, QUEBEC, CANADA.

RAILWAY-CROSSING SIGNAL.

SPECIFICATION forming part of Letters Patent No. 392,798, dated November 13, 1888.

Application filed February 10, 1888. Serial No. 263,610. (No model.) Patented in Canada March 1, 1888, No. 28,589.

*To all whom it may concern:*

Be it known that I, JOHN WILLIAM HARKOM, of Richmond, in the county of Richmond and Province of Quebec, Canada, have invented certain new and useful Improvements in Railway-Signals, (for which I have obtained Letters Patent of Canada, No. 28,589, granted March 1, 1888;) and I do hereby declare that the following is a full, clear, and exact description of the same.

My invention has reference to the night-signals used in connection with the gates placed at the crossings of railways and public roads, (*i. e.*, those in which a pivoted bar is raised or lowered to allow of or stop crossing;) and it has for its object to prevent confusion and danger arising from the fact that the red danger-signal is always in view of the locomotive-driver whether the gate be open or not.

The invention consists of a device used in connection with the swinging lantern and the gate-bar, by which when the gate is shut the red light shall be invisible to the driver and only seen by passengers on the road, but when the gate is open the danger-signal shall be in full view both of the driver on the track and any passengers on the road. It may be thus briefly described: The lantern which serves as a danger-signal is hung centrally on pivots to the bar, and on either side of it and transversely to the bar I place a shield, so that when the bar is down the lantern is hidden from the view of any one looking up or down the track, and only serves as a danger-signal to those on the road. When the bar is raised the lantern swings in the shield, the wings of which are then above and below it, and it is then a danger-signal to the driver as well as to the public.

For full comprehension of the invention, reference must be had to the annexed drawings, forming part of this specification, in which—

Figure 1:
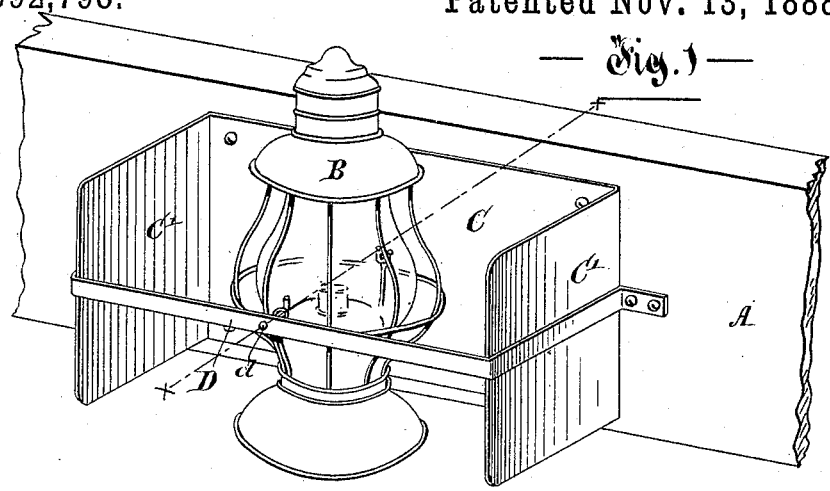
Figure 3:
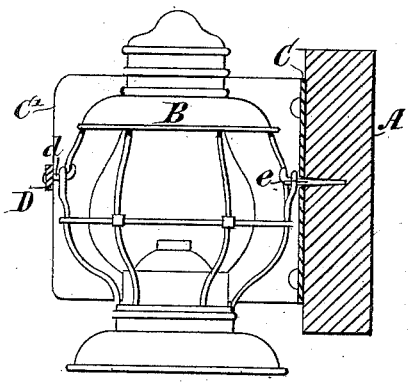
Figure 2:
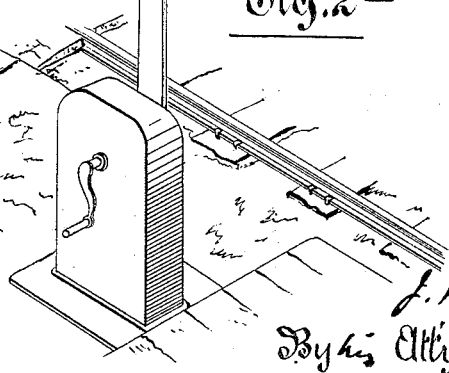

Figure 1 is a view showing the lantern in place on the bar when the gate is shut; Fig. 2, a view of the bar raised and the lantern in position upon it. Fig. 3 is a section on line *x x*, Fig. 1; and Fig. 4, a view showing modification of construction.

Similar letters of reference indicate like parts.

A is the gate bar, and B the lantern, of any suitable type.

C is a shield secured, as shown specially in Fig. 1, to the bar, and having wings C' a sufficient distance apart to allow the lantern to swing freely between them, and projecting from the bar on both sides beyond it.

D is a strap secured to the bar passing along the wings C' C' and across the face of the shield. The lantern is, as shown in Fig. 3, pivoted at *d* to this strap and at *e* to the bar independently of the shield, so as to always swing vertically, whatever may be the position of the bar.

Figure 4:
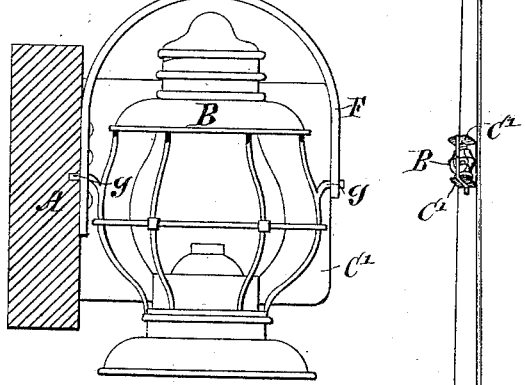

The strap D may, as shown in Fig. 4, be dispensed with, and the lantern be hung, as at *g g*, to the bar and to a bridle, F, secured to the bar, and in this case the central part of the shield may be dispensed with and the wings C' C' attached separately to A.

What I claim is as follows:

1. The combination, with the bar of a railway-crossing gate having a swinging lantern attached thereto, of a shield adapted to obscure said lantern on two of its sides, for the purpose set forth.

2. The combination, with the bar of a railway-crossing gate, of a shield affixed thereto and having two wings, a lantern supported between said wings, and bearings to which said lantern is pivoted, substantially as and for the purpose described.

3. The combination, with the gate-bar A, of the shield C, having two wings, C' C', strap D, and a lantern pivoted to said shield, substantially as and for the purposes set forth.

J. W. HARKOM.

Witnesses:
H. C. DICKSON,
E. G. CLEVELAND.